Dec. 8, 1936.   M. ROMAINE ET AL   2,063,756
BROACHING MACHINE
Filed March 1, 1933   7 Sheets-Sheet 1
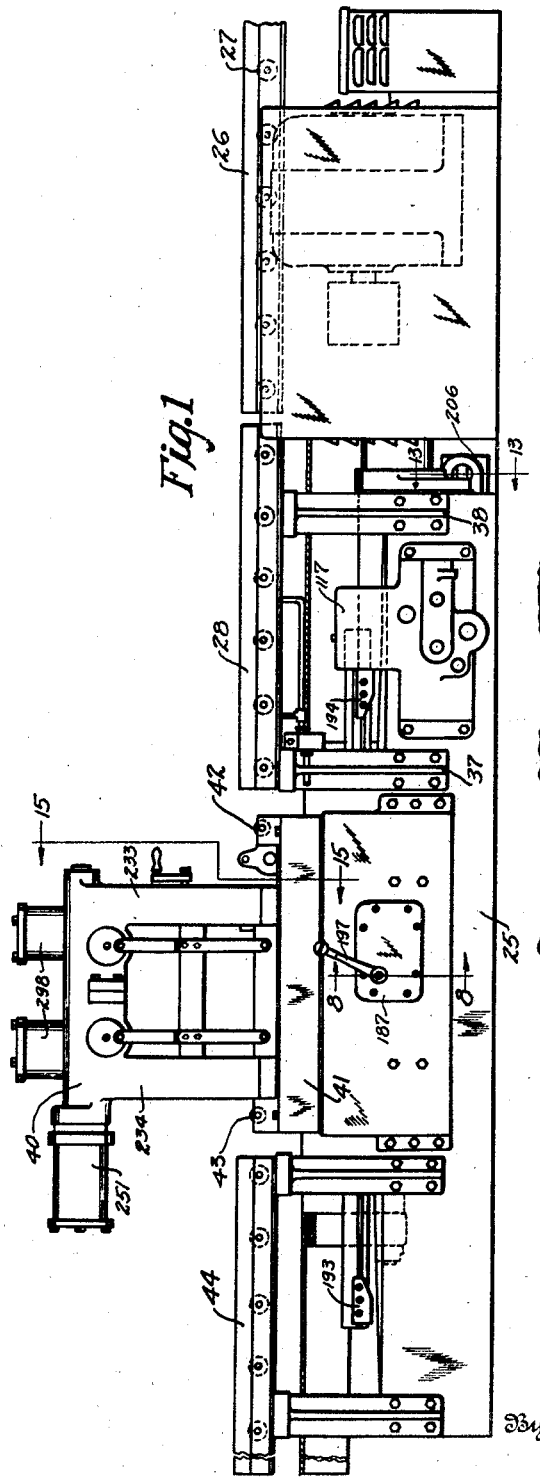
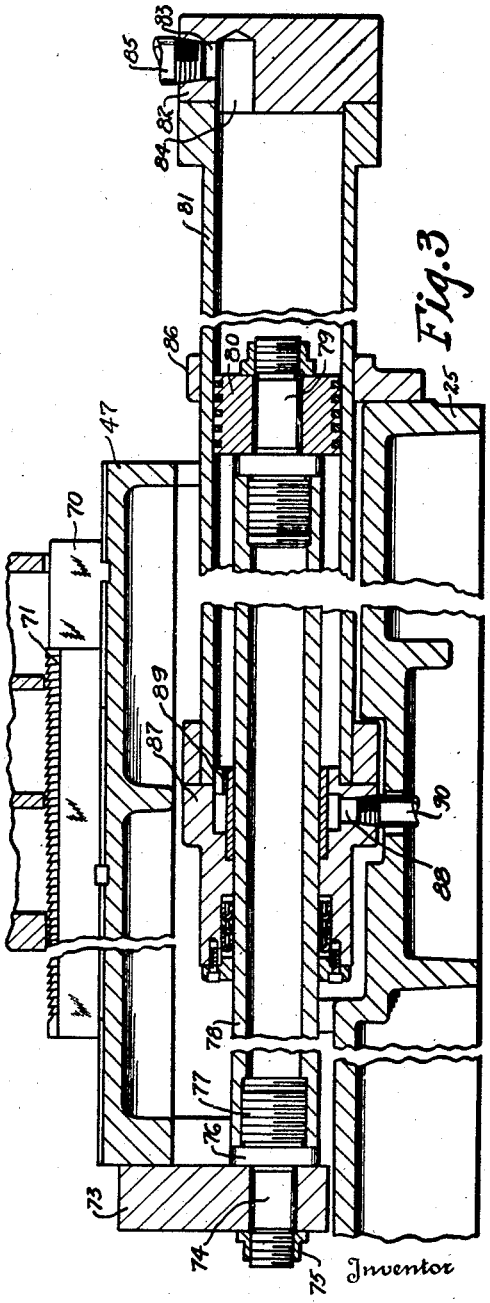
Inventor
MILLARD ROMAINE
ERWIN G. ROEHM
By AHK Parsons
Attorney Dec. 8, 1936.  M. ROMAINE ET AL  2,063,756
BROACHING MACHINE
Filed March 1, 1933  7 Sheets-Sheet 2
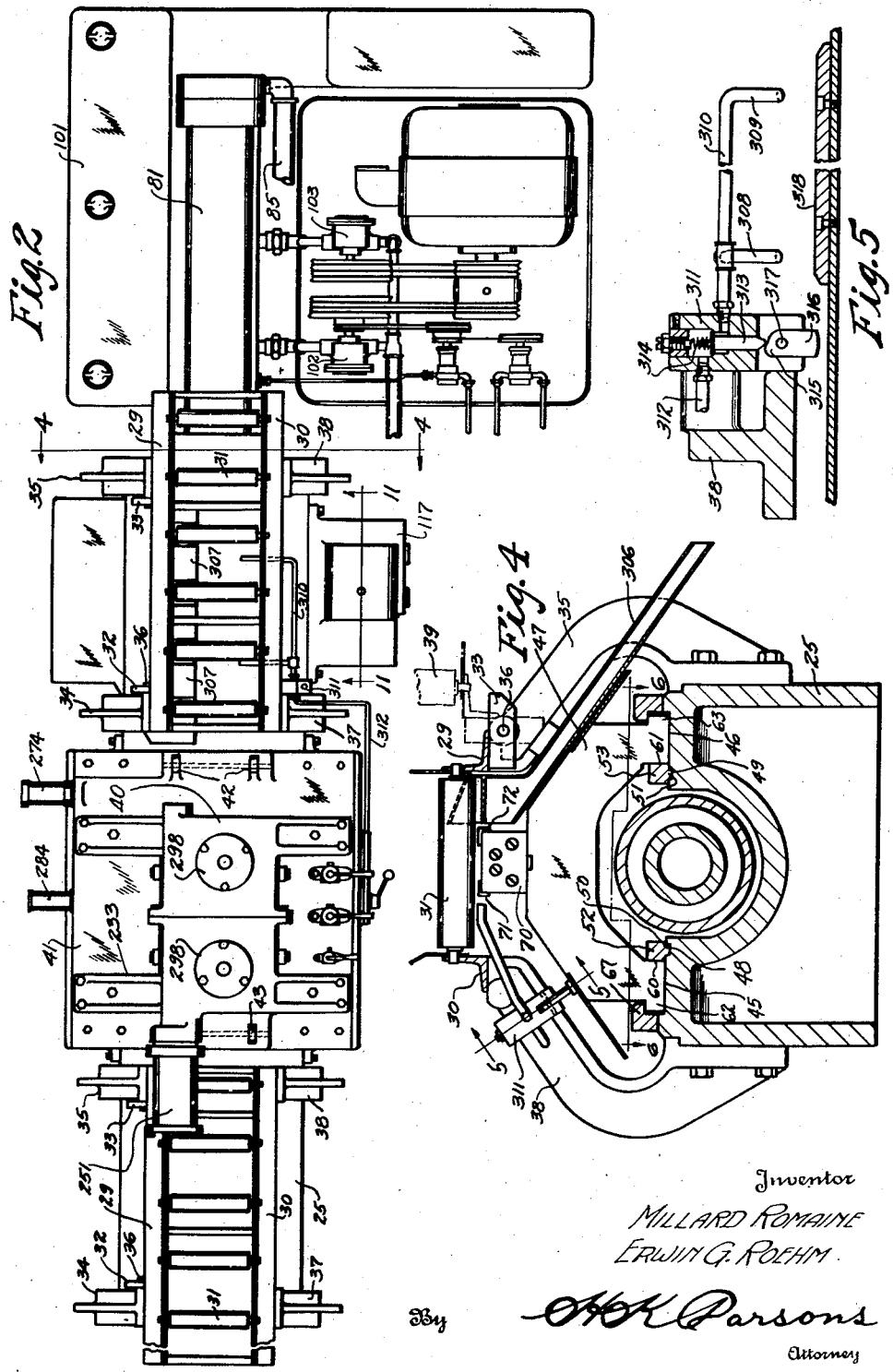
Inventor
MILLARD ROMAINE
ERWIN G. ROEHM
By HK Parsons
Attorney Dec. 8, 1936.  M. ROMAINE ET AL  2,063,756
BROACHING MACHINE
Filed March 1, 1933  7 Sheets-Sheet 3
Fig. 6
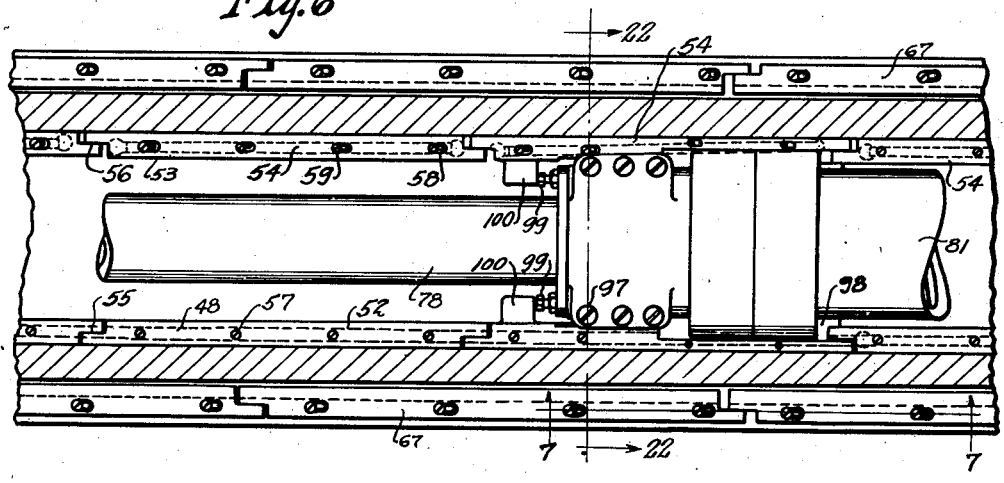
Fig. 7
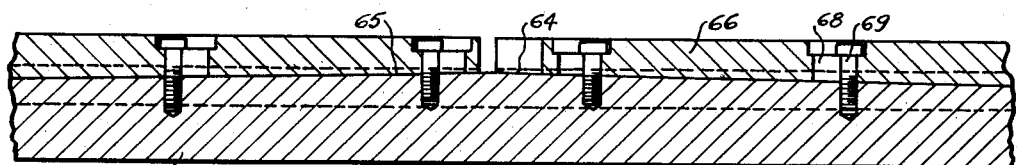
Fig. 8
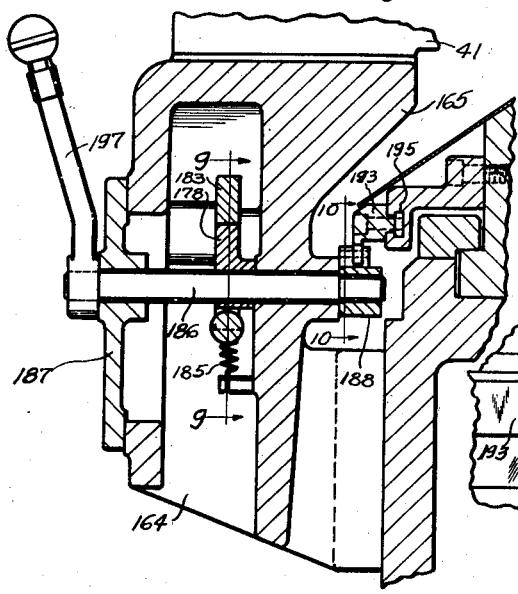
Fig. 9
Fig. 10
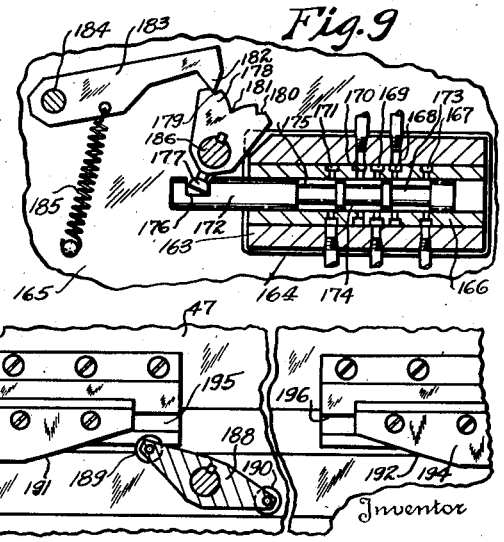
Inventor
MILLARD ROMAINE
ERWIN G. ROEHM
By AHK Parsons
Attorney

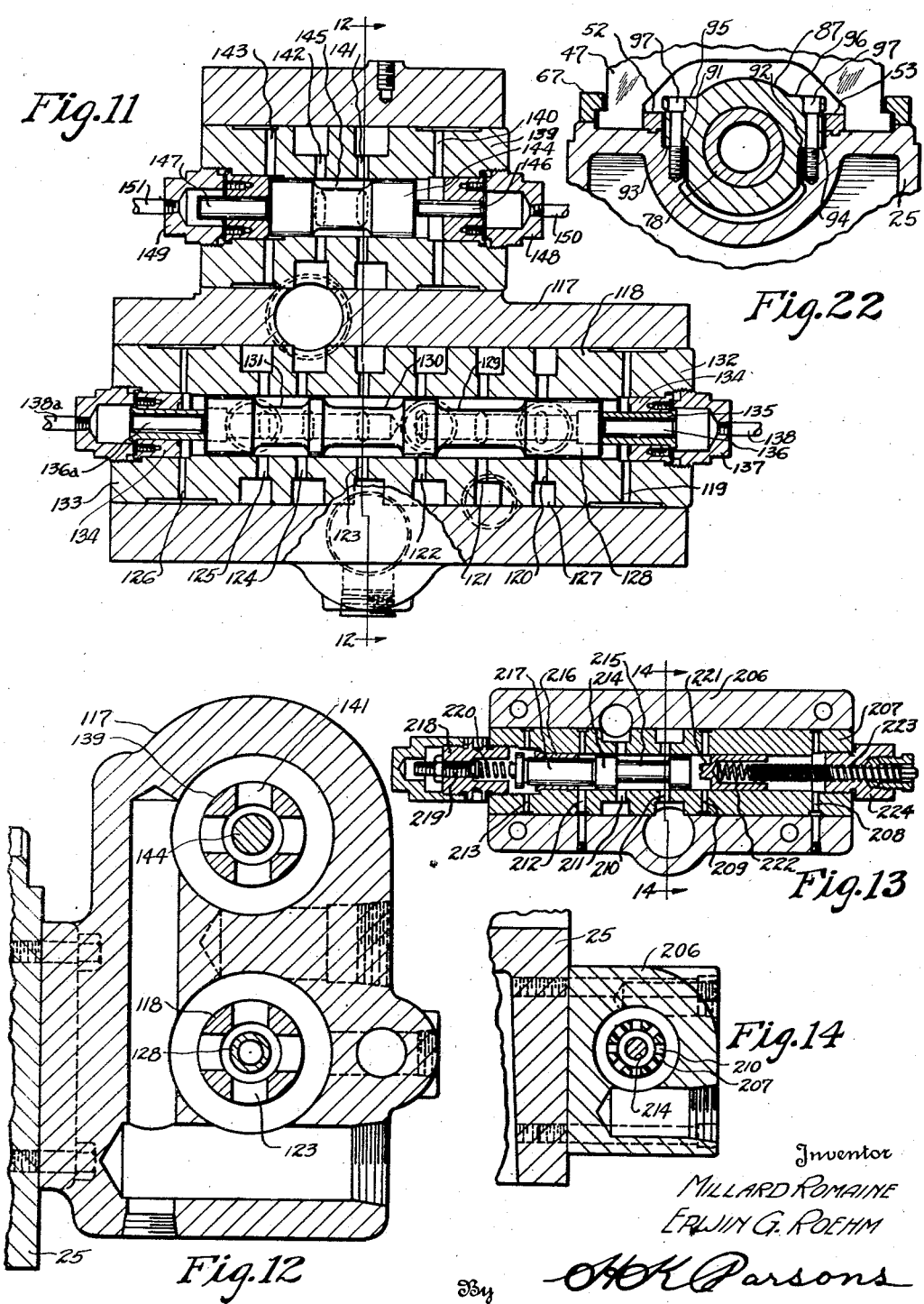

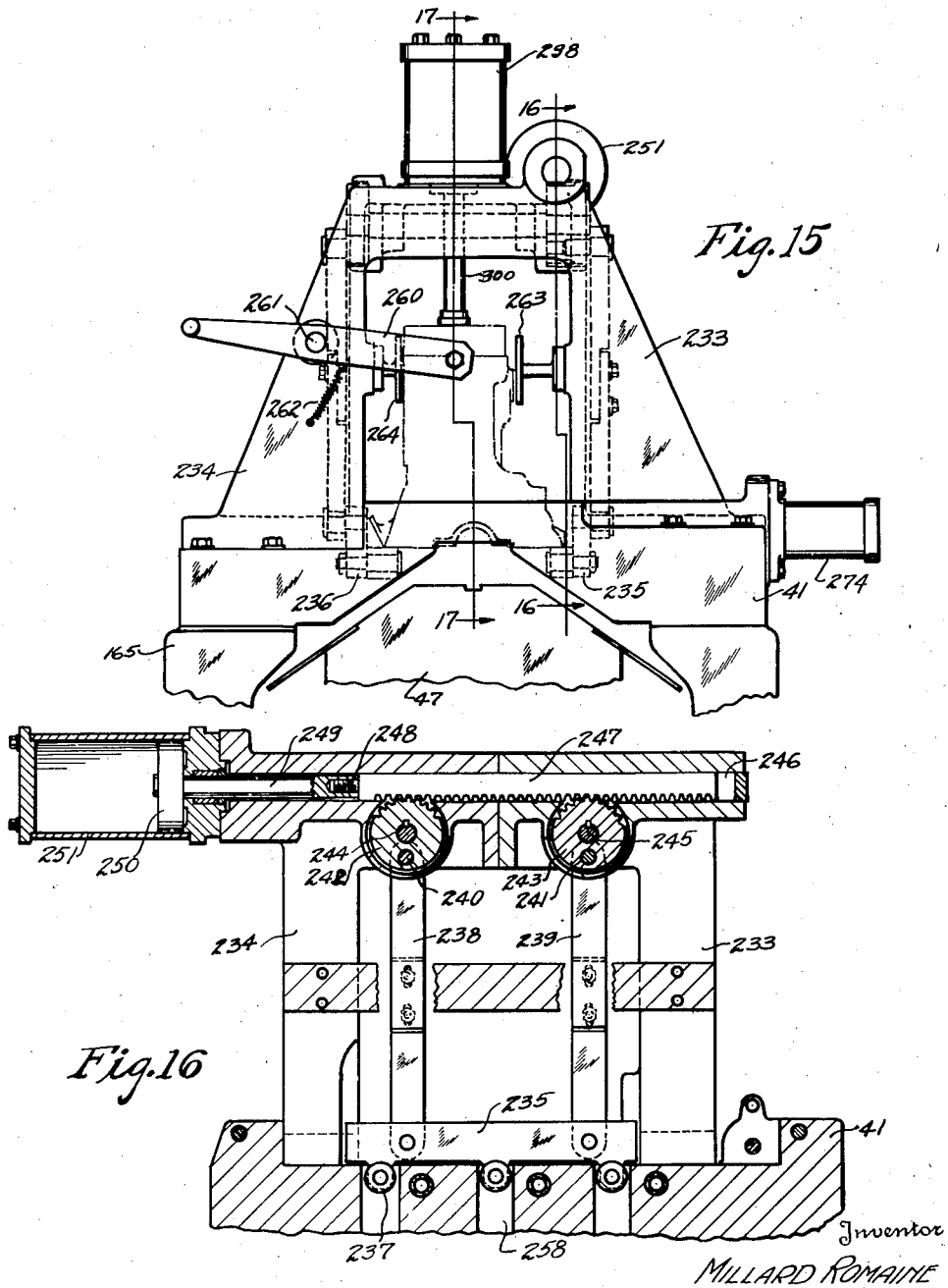

Dec 8, 1936.  M. ROMAINE ET AL  2,063,756
BROACHING MACHINE
Filed March 1, 1933   7 Sheets-Sheet 6
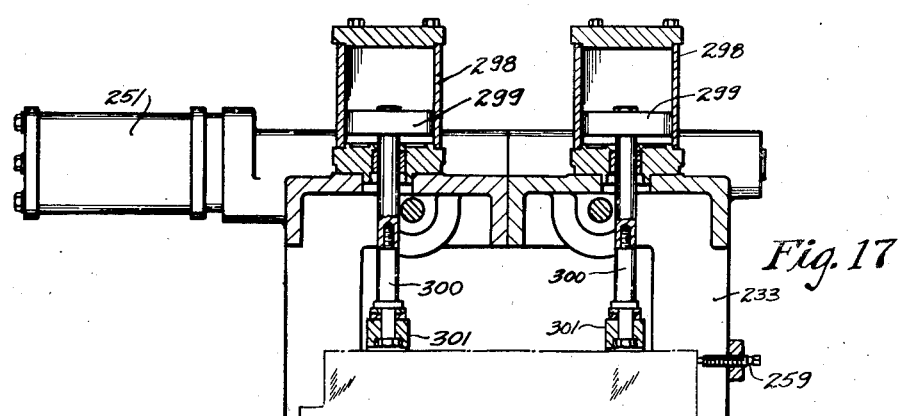
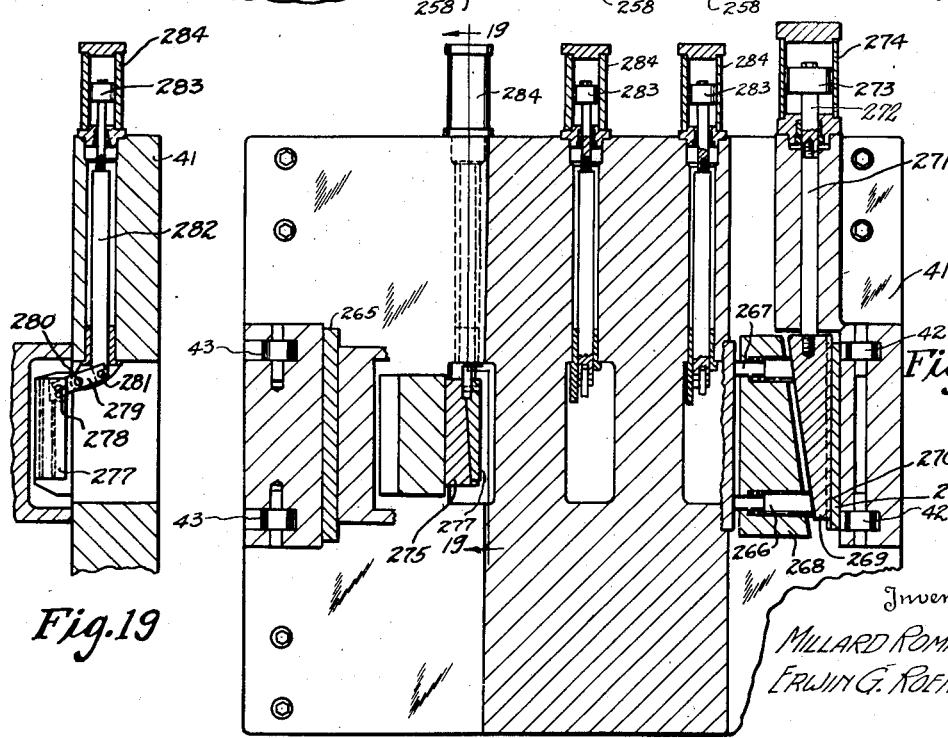
Inventor
MILLARD ROMAINE
ERWIN G. ROEHM
By AHK Parsons
Attorney

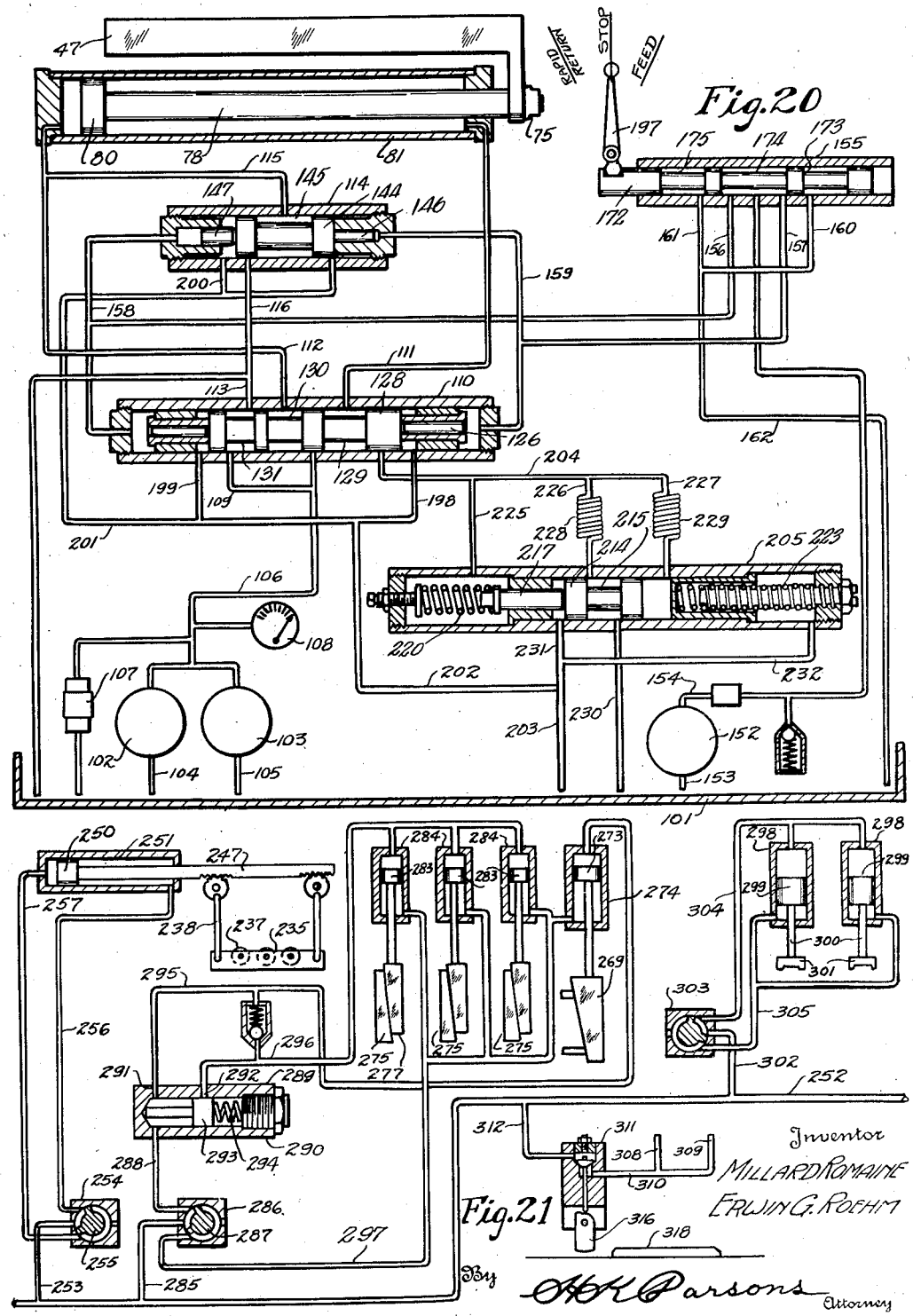

Patented Dec. 8, 1936

2,063,756

UNITED STATES PATENT OFFICE 2,063,756

BROACHING MACHINE

Millard Romaine, Cincinnati, and Erwin G. Roehm, Norwood, Ohio, assignors to The Cincinnati Milling Machine Company, Cincinnati, Ohio, a corporation of Ohio Application March 1, 1933, Serial No. 659,226

8 Claims. (Cl. 90—33)

This invention relates to improvements in machine tools and especially to improvements in broaching machines.

An object of the invention is the provision of an improved broach for expeditiously forming seats or annular recesses on work pieces while the said work pieces are being conveyed through the manufacturing line.

Another object of the invention is the provision of a broaching machine adapted to be disposed in a conveyor line in such manner that substantially no interruption in the travel of the work is had as the said work is being manufactured or processed.

A further object of the invention is the provision of a broach as above specified which includes means for receiving the work from the normal conveying system, positioning same with respect to the broach, and subsequently placing the work in the line for transportation to the next step in the process of manufacture.

A still further object of the invention is the provision of improved means associated with the broach for eliminating play and wear between the several parts in all directions.

An additional object of the invention is the provision of a broach for accomplishing the above objects which is substantially automatic in its performance.

It is also an object of the invention to provide a new and improved hydraulic circuit and control means for effecting the operation of the several parts.

Other objects and advantages of the present invention should be readily apparent by reference to the following specification considered in conjunction with the accompanying drawings, forming a part thereof, and it is to be understood that any modifications may be made in the exact structural details there shown and described, within the scope of the appended claims, without departing from or exceeding the spirit of the invention.

In the drawings:

Figure 1 is a side elevation of the improved broach illustrated as disposed in the normal conveyor line.

Figure 2 is a top plan view of the machine shown in Figure 1.

Figure 3 is a fragmentary longitudinal sectional view through the broach supporting table and the mechanism for effecting the actuation thereof.

Figure 4 is a transverse sectional view, as seen substantially from line 4—4 on Figure 2.

Figure 5 is a fragmentary sectional view taken on line 5—5 of Figure 4, illustrating means for disposing of the chips from the broach and forming a detail of the invention.

Figure 6 is a horizontal sectional view taken on line 6—6 of Figure 4 and illustrating the means for positioning the table relative to the bed.

Figure 7 is an enlarged fragmentary sectional view taken on line 7—7 of Figure 6.

Figure 8 is a fragmentary sectional view taken on line 8—8 of Figure 1 illustrating the valve control mechanism for the table.

Figure 9 is a sectional view taken on line 9—9 of Figure 8.

Figure 10 is a sectional view taken on line 10—10 of Figure 8.

Figure 11 is a sectional view taken on line 11—11 of Figure 2 illustrating the distributor and reversing valves for the table.

Figure 12 is a sectional view taken on line 12—12 of Figure 11.

Figure 13 is a sectional view of the balance valve taken on line 13—13 of Figure 1 included in the hydraulic circuit and forming a detail of the invention.

Figure 14 is a sectional view taken on line 14—14 of Figure 13.

Figure 15 is a side elevational view of the work loading and ejecting mechanism, as seen from line 15—15 on Figure 1.

Figure 16 is a sectional view taken on line 16—16 of Figure 15.

Figure 17 is a sectional view taken on line 17—17 of Figure 15.

Figure 18 is a horizontal sectional view taken on line 18—18 of Figure 17 and illustrating the work positioning and clamping mechanism.

Figure 19 is a fragmentary sectional view taken on line 19—19 of Figure 18.

Figure 20 is a diagrammatic view depicting the hydraulic circuit and valve employed for controlling and effecting the movement of the table.

Figure 21 is a diagrammatic view of the hydraulic circuit employed for centralizing, loading and ejecting the work as respects the machine.

Figure 22 is a sectional view taken on line 22—22 of Figure 6 illustrating the seating of the table cylinder with the bed.

Throughout the several views of the drawings similar reference characters are employed to denote the same or similar parts.

As seen in Figure 1, the machine of this invention comprises an elongated horizontal base or bed 25, the right hand end of which is disposed beneath a conveyor line, indicated generally by the numeral 26. The conveyor line 26 would extend on the right to the machine which operated upon the work prior to the broaching operation, as performed by the machine of this invention. The conveyor 26 comprises, as is usual practice, a plurality of rollers 27 or an endless belt or chain for continuously transporting the work. The conveyor 26 terminates adjacent a receiving platform 28 that is carried by the bed 25 of the machine. The platform 28 comprises side members 29 and 30 spaced from one another to receive between them freely rotatable rollers 31 having their ends journaled in the side members 29. One of said side members, 29 for example, has projecting from it a pair of lugs or ears 32 and 33 respectively lying adjacent bracket members 34 and 35 secured to the side of the bed 25 and extending upwardly therefrom. Pivot pins 36 extend through the lugs 32 and 33 into the brackets 34 and 35. When in operative position, the frame 30 of the carrier rests on additional brackets 37 and 38 also secured to the bed 25 and extending upwardly therefrom.

From the foregoing it will be noted that the platform 28 may be positioned to expose the parts of the machine lying immediately beneath it and would assume a position shown in phantom lines at 39 in Figure 4. As will later be brought out, the positioning of the platform 28 permits a ready access to the broaches for the inspection or replacement thereof.

From the foregoing it will be noted that the work is shot from the conveyor 26 onto the platform 28 along which it is readily movable due to the freely rotatable rollers 31. The machine proper at the left hand terminus of the platform, as seen in Figure 1, is provided with a work receiving and positioning mechanism, indicated generally by the numeral 40 which includes a base member 41 adapted to be fastened to the bed 25. The base 41 has rotatably journaled thereon a roller 42 which receives the work and transfers same to other rollers associated with a lowering and elevating mechanism associated with the work receiving mechanism 40, as will be later described. The base 41 on the other side of the mechanism 40 has a second roller 43 receiving the work from the mechanism 40 after it has been broached and assists in transferring the work to a second platform 44 which is in all respects identical with the platform 28. The said platform 44 terminates at its other end in a continuation of the conveyor mechanism 26 for conveying the work piece to the next step or next machine in its process of manufacture.

The bed 25 beneath the platforms 28 and 44 and the work loading and ejecting mechanism 40 is provided with guideways 45 and 46 on which is mounted a table 47 that carries the broaches. In order to eliminate side play and to subsequently take up for wear between the bedways 45 and 46 and the table 47, the following unique novel construction has been provided. By reference to Figures 4, 6 and 7, it will be noted that the bed 25 at the inside edges of the guideways 45 and 46 has formed therein grooves 48 and 49 respectively receiving tongues 50 and 51 depending from gibs 52 and 53. The groove 48 is straight or parallel with the direction of extent of the way 45 and is continuous from one end of the way to the other. The groove 49, as seen in Figure 6, is broken up into a plurality of grooves 54, which are parallel to one another, but angular as respects the extent of the way 46. In view of the extreme length of the bed and consequently of the gibs, they are each divided into a plurality of parts having overlapping tongues such as 55 and 56. Each of the gibs 52 is provided with a plurality of holes through which pass screws 57 for securing same in definite immovable positions. The gibs 53 are each provided with a plurality of counterbored elongated perforations 58 through which pass clamp screws 59.

The operation of these parts for eliminating the lateral play is as follows: With the gibs 52 mounted and secured in position, the gibs 53 are axially shifted, which through interengagement of their angular lugs 51 and angular ways or seats 59 cause the outer surface to shift laterally and thereby take up any play or clearance between the gib faces 60 and 61 of the table 47. As was noted above, this mechanism is employed for laterally adjusting the table with respect to the bed.

In order to obtain and maintain proper seating of the table 47 on the ways 45 and 46 the table has formed longitudinally thereof flanges 62 and 63. The flanges 62 and 63 are substantially identical in construction and each is provided with a pair of inclined surfaces 64 and 65 extending in opposite directions from a point substantially midway of the length to the outer edges thereof. Mounted on the inclined ways 64 and 65 is a plurality of gibs 66 each having extending therefrom a lip 67 engaging the upper surface of the table flanges 62 and 63. Each of the gibs 66 is provided with a plurality of counterbored elongated perforations 68 through which pass clamp screws 69 for securing the gibs to the ways 64 and 65.

In order, therefore, to secure proper engagement between the table ways 45 and 46 and the bed 25 it is only necessary to loosen the clamp screws 69 and slide the gibs axially relative to the ways 64 and 65, which causes the lips 67 thereof to engage with the flanges 62 and 63, whereupon the said screws are again clamped. From the foregoing it will be noted that the table 47 is properly positioned to eliminate all relative undesirable movement between it and the supporting bed for thereby insuring the movement of the table through a definite unvarying path.

The table 47 has mounted on its upper surface a block 70 to which is secured in this instance a pair of broaches 71 and 72. It is to be noted, however, that only one, or more than two, broaches may be secured to the block 70, as the nature of the work demands.

The table 47 is actuated relative to the bed by hydraulic means, for which purpose it has secured to it and depending therefrom a bracket or lug 73 having formed therethrough a perforation through which passes a stud 74. One end of the stud 74 is threaded to receive a nut 75 for securing the lug 73 between itself and a head 76 formed integral with the stud. On the other side of the head 76, the stud is provided with a threaded tang 77 received in a threaded counterbore in one end of a hollow piston rod 78. The other end of the rod 78 is also provided with a threaded counterbore receiving a threaded tang on one end of a stud 79, which is similar in all respects to the stud 74. The stud 79, however, is secured in a suitable piston 80 adapted to be reciprocated through a cylinder 81 which is mounted securely to the bed 25.

The cylinder 81 has secured to its outer end a head 82 through which are formed ports 83 and 84 for connecting a hydraulic medium with the interior of the cylinder. For this purpose the port 83 receives one terminus of a conduit or pipe 85 of a hydraulic actuating and control system which will be later described in detail. The cylinder 81 extends through a cradle or support 86 that is secured to and extends upwardly from the bed 25 and supports the cylinder intermediate its ends. The other or inner end of the cylinder 81 is closed by a combined cylinder head and stuffing box 87 in which are formed ports 88 and 89 for connecting the hydraulic system with this end of the cylinder. For this reason the port 88 also receives the terminus of a hydraulic conduit or pipe 90 of the hydraulic system above referred to. The cylinder head and stuffing box 87 is formed on opposite sides with a relieved or cut away portion to form seats 91 and 92 received on similar seats 93 and 94 provided by the bed 25. In addition, the head 87 has flaring from it and above the seats 91 and 92, ears or lugs 95 and 96 having formed therethrough a plurality of bores through which clamp screws 97 pass for securing the cylinder immovably to the bed 25. In order to position the cylinder with respect to the bed and to avoid the thrust of the hydraulic pressure being directed on the clamp screws 97, the cylinder head seats against a circular flange 98 formed integral with the bed 25. The head 87 on its other end has a plurality of axially adjustable abutments 99 adapted to engage with lugs or ears 100 extending from the bed 25. In other words, the cylinder is axially positioned and clamped to the bed between the flange 98 and the lugs 100 prior to the fastening thereof by the clamp screws 97. By this construction the end thrust on the cylinder is taken by integral parts of the bed itself and thereby relieves the strain on the clamping and holding mechanism.

The hydraulic system for effecting and controlling the movement of the piston and consequently of the table connected thereto, is diagrammatically illustrated in Figure 20 and as there shown comprises a sump or tank 101 for containing the fluid, preferably oil, utilized in the system. In view of the large quantities of oil necessary to effect the operation of the parts, there is shown a pair of pumps 102 and 103 respectively having a suction line 104 and 105 for drawing the fluid from the tank and discharging said fluid under pressure into conduits or lines 106 connected with each pump. A pressure control or relief valve 107 is provided for determining the pressure in the line 106 with which line is also connected a suitable gauge 108. The line 106 has a branch line 109 and they terminate in a valve, indicated generally by the numeral 110 and constituting a directional control or reversing valve. The valve 110 connects the line 106 or its branch line 109 with either of three conduits 111, 112 and 113, the latter extending directly to the tank or sump 101 for short circuiting the system and the other two terminating respectively at the right and left hand ends of the cylinder 81. The line 111 shown diagrammatically in Figure 20 is the same as the pipe or conduit 85 shown structurally in Figure 3, while the line 112 diagrammatically shown in Figure 20 is structurally shown as pipe or conduit 90 in Figure 3. The valve 110 is shown in Figure 20 as in position to short circuit the system and return the fluid in the lines 106 and 109 to the sump or tank 101. As also shown in this figure, between the reversing valve 110 and the piston and cylinder there is provided a second valve for permitting, when in the proper position, the rapid escape of the fluid from one side of the piston and indicated generally by the numeral 114. This valve 114 is connected by a line or conduit 115 with the line or conduit 112 extending from the left hand end of the table cylinder. The other side of the valve 114 is connected by the line or conduit 116 with the conduit 113 terminating in the sump or tank 101.

The valves 110 and 114 are shown structurally in Figure 11 as enclosed within a single casing 117 having a pair of bores formed therein and disposed one above the other. Within the longer bore is the reversing valve which comprises a valve bushing 118 having formed therethrough sets of radial ports 119, 120, 121, 122, 123, 124, 125 and 126, each set being connected by a circumferential groove 127 formed on the exterior of the bushing. Extending through the bushing bore is a spool type valve 128 having cannelures 129, 130 and 131 for connecting certain of the sets of radial ports in different combinations. The chamber containing the bushing 118 is closed at opposite ends by heads 132 and 133 which are substantially identical in construction and in each of which is mounted a guide 134 for a headed sleeve 135 and a piston plunger 136. The guides 132 and 133 are further provided with chambered plugs 137 through which the head of the sleeve 135 shifts and connected with the outer end of the plugs 137 is one end of a conduit 138 of a control hydraulic system to be later described and which effects the shifting of the valve 128.

The rapid traverse control valve 114 is mounted in the shorter of the bores in the casing 117 and comprises a bushing 139 similar to the bushing 118 which has formed therethrough sets of radial ports 140, 141, 142, and 143. In the bore through the bushing 139 is a spool type valve 144 having a cannelure 145 adapted in one position to connect the sets of ports 141 and 142 and in the other position to interrupt the connection thereof. The ends of the chamber containing the bushing 139 are closed in the same manner as the ends of the chamber containing the bushing 118 and the said closures each have mounted therein a piston plunger 146 and 147 of different areas, whereby with equal pressures on the ends thereof, the valve will be shifted by the larger piston plunger 147 for a purpose that will be later made clear. The said chamber closures also each include a plug 148 and 149 with which is respectively connected one terminus of conduits 150 and 151 which are a part of the control hydraulic circuit above referred to.

The hydraulic control circuit above referred to comprises a pump 152 having a suction line 153 for drawing the hydraulic fluid or medium from the tank 101 and discharging same into the line or conduit 154. The line 154 terminates at a pilot valve indicated in its entirety in Figure 20 by the numeral 155. The valve 155 is adapted in one position to connect the hydraulic medium with a pair of lines or conduits 156 and 157 which respectively terminate in lines or conduits 158 and 159. The conduit 158 in turn connects with conduits 138a and 151 respectively actuating the piston plungers at the left hand ends of the valves, as seen in Figure 11, while the conduit 159 connects the conduits 138 and 150 extending from the right hand ends of said valves. The valve 155 is also adapted in different positions thereof, to connect the line 154 independently with either line 156 or 157 and to connect the other with branch conduits or lines 160 and 161 which terminate in a common discharge line 162 that has its terminus in the sump or tank 101 whereby the reversing or directional control valve and the rapid traverse valves are shifted to different operative positions.

The pilot valve 155 and mechanism for controlling and operating it is shown structurally in Figures 8, 9 and 10, particularly in Figure 9. As there shown, the valve comprises a casing 163 mounted within a recess 164 formed in a bracket 165 bolted to the face of the bed 25. The bracket 165 is secured to the forward face of the bed 25 and a corresponding bracket is secured to the rear face thereof, which brackets support the base 41 of the loading and ejecting mechanism and constitute a bridge on which the work finally comes to rest while being operated upon. The valve casing 163 has formed therein a bore in which is pressed the valve bushing 166 having formed therethrough a plurality of sets of radial ports 167, 168, 169, 170 and 171 with which the ends of conduits 160, 157, 154, 156 and 161 respectively connect. Extending through the bushing 166 is a spool type valve 172 having formed thereon cannelures 173, 174 and 175 which in the several positions of the valve connect the conduits or complete the different circuits above enumerated. The valve 172 has formed integral therewith a stem in which is formed a notch 176 receiving the ball end 177 of a load and fire dog 178. The dog 178 is provided with two shallow notches 179 and 180 intermediate which is a notch 181. The several notches are connected by contoured or cam shaped walls which co-operate with the nose 182 of a latch 183 pivoted at 184 within the recess 164 of the bracket 165. A spring 185 has its one end anchored to the bracket 165 and its other end connected with the latch 183 for yieldingly urging the latch about its pivot to cause engagement between the nose 182 thereof and the load and fire dog 178.

The operation of the load and fire dog is such that with the valve in the position as shown in Figure 9, the latch 183 engages the shallow notch 179 for holding the valve in its extreme left hand position and a slight movement of the valve to the right will disengage the notch 179 and latch, causing said latch to ride over the peak or apex of the joined walls of the notches 179 and 181 whereupon the valve will be actuated to its neutral position until the latch is in the deep notch 181 thereof. When the valve is in its extreme right hand position, the latch is engaged with the shallow notch 180 whereupon a slight movement of the dog or valve in the opposite direction results in the reverse movement of the parts until the latch again comes to rest in the large or deep notch 181.

The dog 178 is secured to a shaft 186 which spans the recess 164 and projects beyond the limits of the bracket 165 and is journaled at one end in said bracket and on the other end in a plate 187 secured to the face of the bracket 165. To the rear end of the shaft 186, which extends beyond the journal thereof in the bracket 165, is secured an elongated arm 188 having journaled in each end thereof a roller 189 and 190. The rollers 189 and 190 are adapted to be respectively engaged by cam faces 191 and 192 formed on reversing dogs 193 and 194 adjustable through slots 195 and 196 formed in or secured to the side of the table 47.

The operation of these parts is as follows: With the dog 178 in the position shown in Figure 9 and the arm 188 in the position shown in Figure 10, the table 47 is moving to the right, as seen in these figures. The table carries with it the dog 193 the cam face 191 of which will eventually engage the roller 189 and tend to depress same thereby oscillating the arm 188, shaft 186 and dog 178 in a counterclockwise direction, unseating the latch 183 from the shallow notch 179 whereupon the camming action or the firing of the latch 183 and dog 178 by the spring 185 is had, as above described for returning the pilot valve to its normal or neutral position. The dog 197 and consequently the valve 172 are initially shifted by manual means, for which purpose the shaft 186 journaled in the plate 187 projects beyond the said plate to receive a manually operable lever 197. The lever in addition to initially setting the valve and initially setting the load and fire mechanism also acts as a directional indication lever so that the table will move in the direction in which the lever is shifted.

In the operation of the control circuit or mechanism, the lever 197 has three positions, indicated in Figure 20 as "rapid return", "stop" and "feed." The parts are shown with the lever 197 in its neutral or stop position at which time, as above described, the pressure from the pump 152 through the line 154 is connected by the cannelure 174 of the pilot valve 172 with the conduits or lines 156 and 157. The same pressure will therefore be in the lines 158 and 159 and consequently in the conduits 151, 150, 138a and 138. These conduits direct the pressure against piston plungers 147, 146, 136a, and 136. Since the piston plungers 136 and 136a are of the same cross section it will result in the centralization of the reversing valve 128, as shown in Figure 20, while since the piston plunger 147 is of a greater cross section than the piston 146, it will result in the valve 144 being shifted to its extreme right hand position. At this time then the pressure in line 106 from the pumps 102 and 103 will be short circuited through the branch line 109, cannelure 131 of the valve 128 with the return conduit 113 which terminates in the sump or tank 101, resulting therefore in no movement of the table. At the time of shifting of the piston plungers 136, 136a, and 147 the exhaust medium ahead of these plungers was respectively exhausted through ports 119, 126 and 143 which respectively connect with branch exhaust lines 198, 199 and 200 each of which is connected with a conduit or port 201 and in turn emptying into a conduit or port 202 connected with a conduit 203 terminating in the sump or tank 101.

If the lever 197 is now shifted to the right or to the feed position, as shown in Figure 20, the pilot valve would be shifted to the left and thereby connect through the cannelure 174 the lines 154 and 156 and would connect through the cannelure 173 the lines 157 and 160. At this time the conduit 158 and conduits 138a and 151 would be under pressure while the conduit 159 and conduits 138 and 150 would be connected to the exhaust. Since the rapid traverse valve 144 would already be to its right hand limit of movement no further movement would be imparted thereto, but by relieving the pressure on the piston plunger 136 the reversing valve 128 would be shifted to its extreme right hand position. This then would uncover the port 123 and cover the port 125 so that the pressure in the line 106 would be coupled or connected through the cannelure 130 with the conduit 112 and act on the left hand face of the piston, thereby moving the table to the right. At this time the exhaust ahead of the piston would be connected through the conduit 111 to the port 122 and through the cannelure 129 with the port 120 and a conduit 204 connected therewith. The conduit 204 passes through a back pressure balancing valve indicated in its entirety by the numeral 205, which will be explained in detail later. The table will continue to move in a direction toward the right at a feeding rate of speed until one of the table dogs 192 or 193 engages with its roller on the arm 188 and thereby shifts the valve to its neutral or stop position, whereupon the table will be brought to a standstill.

The lever 197 is now shifted to the left or to the rapid traverse position for thereby connecting the control pressure line 154 with the line 157 and connecting the line 161 with the line 156. This then reverses the pressures in conduits 158 and 159 and consequently in the control conduits to the piston plungers. In other words piston plungers 146 and 136 are now under pressure for shifting the rapid traverse valve 144 to its left hand position and shifting the reversing valve 128 to its left hand position. At this time the full capacity of the pumps 102 and 103 is being discharged into the small end of the cylinder, that is, the end through which the large piston rod is disposed. Since the capacity on both sides of the piston is thereby greatly changed, the piston and parts carried thereby will tend to move at a rapid rate. And to insure that the oil or other hydraulic medium can escape fast enough from the large end of the cylinder, use is made not only of the conduit 112 through the conduit 113, but also through the branch conduit 115 which is at this time connected with the conduit 116 and conduit 113. From this it will be seen that the piston and parts operated thereby are travelling at a rapid rate toward their initial position. This movement continues until the other dog 193 or 194 on the table engages the other of the rollers on the arm 188 and again returns the valve to its neutral or stop position.

The back pressure valve 205 is employed for insuring a continuous even movement of the table and consequently the cutters and to eliminate any possible surging or running ahead thereof. This valve is shown structurally in Figures 13 and 14 and comprises a casing 206 secured to the bed 25 and having formed therein a chamber containing the valve bushing 207 through which sets of radial ports 208, 209, 210, 211, 212 and 213 are formed. Extending through the bore in the bushing 207 is a spool type valve 214 having a cannelure 215 for controlling the connection of ports 210 and 211. Also mounted in the bore in the bushing 207 is a sleeve 216 in which is disposed for movement relative thereto a piston plunger 217 adapted to abut one end of the piston valve 214. Closing this end of the bushing bore is a plug 218 having threaded therein the screw 219 forming one abutment for a spring 220 that abuts on its other end with the piston plunger 217. Mounted in the bore of the bushing 207 on the other side of the valve 214 is a shiftable abutment 221 contacted on one side by a spring 222, whose characteristic and effective length may be varied by means of a screw 223 with the threads of which the spring 222 meshes. The screw 223 is threaded through a plug which closes this end of the bushing bore.

Referring now to the diagrammatic illustration in Figure 20, it will be noted that the normal discharge line from the reversing valve 110 has extending from it three conduits 225, 226 and 227. Conduit 225 is connected with the bushing port 213 and therefore places the pressure on the outer end of the piston plunger 217 equal to the pressure in the line 204. The conduit 226 connects with the port 211 and has a resistance therein which is relatively low and consists of a coil or pipe 228 having a comparatively small bore therethrough. The conduit 227 connects with the port 209 and also has a hydraulic resistance therein which is comparatively high as respects the hydraulic resistance 228 and also comprises a coil 229 having a bore therein smaller than that in the coil 228. The port 210 is connected by a discharge pipe 230 with the sump or tank 101. The ports 208 and 212 are connected by branch conduits 231 and 232 with the discharge conduit 203 and constitute drains for draining the hydraulic medium that may leak past the piston plunger 217 and spring abutment 222.

The operation of this valve is as follows: When the table is moving in a feeding direction the discharge fluid from the piston and cylinder is, as above described, into the conduit 204 from which it passes through conduits 225, 226 and 227. The pressures therefore in the chamber ahead of the piston plunger 217 and in the chamber ahead of the spring abutment 222 will be equal for thereby centralizing the valve 214 and connecting the ports 211 and 210 to permit a continuous flow of fluid through the conduit 226, hydraulic resistance 228 and conduit 230 into the sump or tank 101. This will continue so long as the tool is feeding at a uniform rate, but should the tool attempt to coast ahead a greater amount of fluid would then be discharged into the conduit 204 which would immediately build up the pressure ahead of the piston plunger 217 causing same to advance and thereby closing down on the discharge through the port 211 and immediately slowing up the movement of the tool. The pressure, however, will then be forced through the resistance 229 into the chamber ahead of the spring abutment 222 and thereby again balance the pressures and force the piston back to its normal position, allowing the tool to advance at its normal desired rate. This shuttling back and forth of the valve 214 would continue until the tool again settled to a constant uniform feeding rate.

The mechanism for lowering the work into position for operation thereon and subsequently ejecting same and for centralizing and clamping it, is illustrated in Figures 15 to 19, inclusive, and Figure 21. This mechanism comprises the base plate 41 above referred to, to which is secured a pair of frames 233 and 234 which are connected to one another. Disposed within this frame is an elevating and lowering mechanism comprising a pair of bars 235 and 236 each being provided with a plurality of rollers 237 which when in an elevated position are in the same plane as the conveyor rolls 27 and 31 and receive the work from the said rolls 31. Extending upwardly from each of the bars 235 and 236 is a pair of arms 238 and 239 which have their upper ends pivoted respectively at 240 and 241 to gears 242 and 243. The gears 242 are keyed or otherwise secured to a shaft 244 which is journaled in the frame 234 while the gears 243 are likewise keyed or otherwise secured to a shaft 245 journaled in the frame 233. Above one set of gears 242 and 243 the frames 233 and 234 are provided with an aperture 246 in which is disposed for axial movement relative thereto a rack bar 247 meshing with the gears 242 and 243. One end of the rack bar 247 is connected as at 248 with a piston rod 249 extending from a piston 250. The piston 240 is in turn enclosed within a cylinder 251 secured in any desirable manner to one of the frames, 234 for example.

The piston 250 is adapted to be operated by a hydraulic fluid, such as air for example, as shown in Figure 21. As there shown, an air pressure line 252 is provided from which the conduit 253 extends and terminates in a three way valve 254. As illustrated in Figure 21, the valve member 255 is positioned to connect the conduit 253 with the conduit 256 terminating at one end of the cylinder 251 and thereby shifting the piston to the left. The other end of the cylinder 251 is opened to the atmosphere through the conduit 257 which terminates in the valve 255.

From the foregoing and due to the eccentric mounting of the arms 238 and 239 on the gears 242 and 243, it will be noted that as the said gears are rotated in a given direction the arms will be raised and consequently the bars 235 and 236, while a reverse rotation thereof will cause the said arms and bars to be lowered. The parts are so arranged that the rollers 237 disappear into recess 258 below the upper surface of the base 41, leaving the work to be operated upon resting on said base.

The work in actual practice is actuated toward the right, as seen in Figure 17, and is moved onto the rollers 237 until it is arrested by the abutment 259, here shown as a screw. This screw passes through the end of a lever 260 pivoted intermediate its ends as at 261 to the frame 233. A spring 262 is provided and has one end attached to the lever and the other end anchored in the frame 233 for normally disposing the said arm and abutment in an inoperative position. This it will be noted provides a means for roughly positioning the work prior to its disposal on the supporting base 41.

In order to laterally position the work, there is provided a pair of positioning members, here illustrated as large flanges 263 and 264 projecting inwardly from the frames and between which the work is actuated on to the lowering and elevating rollers 237.

The work after being positioned on the base 41 is then finely adjusted and positioned, for which purpose, the following mechanism is provided. A master or final abutment 265 is provided being carried by the base 41 and against which one edge of the work is forced. The other end of the work is adapted to be engaged by spring loaded pusher pins 266 and 267 slidably mounted in a block 268 projecting upwardly from the base 41. Contacting with the free ends of the pusher pins 266 and 267 is a wedge member 269 having a dove-tailed connection at 270 with a slide 271 carried by the base plate 41. The wedge 269 is secured to the free end of a piston rod 272 which carries at its other end a piston 273 within the cylinder 274.

The particular work piece here illustrated has a plurality of ribs or portions intermediate its ends which are adapted to be individually and successively engaged by the broaches during the operation thereon. It has been found desirable to back up these portions of the work and for this reason a plurality of backing up members have been provided which are of the same construction and it is, therefore, deemed sufficient if but one of them be described in detail. This comprises a fixed slide member 275 having a dove-tailed connection 276 with a movable wedge 277. The formation of the wedge is such that the faces of the dove-tailed connection are at an angle to one another whereby the outer operative face of the sliding wedge block 277 is always parallel with the portion of the work with which it is engaged. The wedge block 277 has pivotally connected to it at 278 one end of a lever 279 which is intermediately pivoted at 270 to a fixed part of the mechanism. The other end of the lever 279 has a pin and slot connection at 281 with a piston rod 282 slidable through suitable guide provided in the base 41. The piston rod 282 is connected to a piston 283 within the cylinder 284 and carried by the base plate 41. As was above noted, there is a plurality of these backing up mechanisms provided, in fact, one for each portion of the work to be broached.

In practice it is desired that the work be first positioned by engaging the fixed abutment block whereupon the backing up members are operated and the pressure on each of them equalized. To accomplish this, hydraulic means, preferably compressed air, has been provided for operating the parts and, as seen in Figure 21, comprises a conduit 285 extending from the pressure conduit 252 and terminating in three way valve 286. The valve member 287 of this valve is so positioned as to connect the conduit 285 with conduit 288 which terminates in the control valve 289. The control valve 289 is adapted to insure the operation of the work clamping mechanism prior to the operation of the backing up members and therefore comprises a casing 290 through which a pair of ports 291 and 292 are provided. Within the casing 290 is a piston 293 normally held to the left by spring 294 for closing off communication through the port 292. Therefore, when the valve member 287 is actuated, the pressure passes through the conduit 288 into the conduit 295 to the cylinder 274 for first actuating the piston 273 therein. As soon as this piston has reached the limit of its movement, the pressure builds up in the casing 290 and actuates the piston 293 therein against the resistance of the spring 294 thereby uncovering the port 292 and establishing a connection or communication between the conduit 288 and conduit 296 extending from the port 292. The conduit 296 is connected by branch conduits with each of the equalizing cylinders 284. The exhaust from each of the cylinders 274 and 284 is connected by branch conduits with the conduit 297 which terminates at the valve 286.

After the work has been properly positioned and backed up it is then clamped to or held down on the supporting surface of the base 41. For this purpose each of the frames 233 and 235 has mounted on its upper surface a cylinder 298 containing a piston 299 from which extends a piston rod 300. The piston rods 300 are each provided with a clamping shoe 301 adapted to engage the upper surface of the work. These cylinders are also connected by a conduit 302 through a three way valve 303 and conduit 304 with the compressed air line 252. In view of the fact that they are connected with the same line, equal pressures will therefore be had on each of the clamping shoes. The exhaust ahead of said pistons is connected with branch conduits to the conduit 305 that terminates at the valve 303.

From the foregoing description it will be noted that there has been provided a broaching machine adapted to be inserted within the normal manufacturing line which comprises a continuous conveyor for transporting work pieces to successive machines for successive operations thereon. It will be noted that the work is readily positioned and operated upon, whereupon it is immediately started on its journey to the next machine in the line. It is believed that the novelty and advantages of the broach here described will be readily understood.

In order to dispose of the chips carried along by the broach, there is provided a novel mechanism therefor. This consists of a chip receiving chute 306 mounted on the bed beneath the platform 28 and which has a plurality of mouths 307 into which the chips are blown for delivery to suitable receptacles placed at the end of the trough. The chips are blown from the cutters and table by compressed air passing through nozzles 308 and 309 each connected with a pipe 310 that terminates at a valve 311. The valve 311 normally prevents the flow of compressed air from the pipe 312 into the pipe 310. This is done by valve member 313 spring loaded as by a spring 314 which has contacting with its free end the nose 315 of a dog 316 pivoted at 317 to the end of the valve housing 311. As the table 47 moves along, it carries with it a dog 318 adapted to engage the latch 316 for opening the valve 313 and thereby blowing the chips, as above described. This valve is shown structurally in Figure 5 and diagrammatically in Figure 21 and is connected in with the normal compressed air line 252.

What is claimed is:

1. A work receiving and positioning mechanism for use with broaching machines disposed in the normal processing line which includes a conveyor the combination of a work support, a frame associated with the work support receiving the work from the conveyor, means carried by the frame for positioning the work with respect to the work support, hydraulically actuated means for lowering the work onto the support, hydraulically actuated means for positioning the work on the support, and hydraulically actuated means for clamping the work on the support after it has been positioned, said work having a plurality of rib-like portions each of which is adapted to be machined, and hydraulically actuated means for backing up said rib-like portions of the work.

2. A conveyor line broach of the nature disclosed including a fixed bed member having a work receiving seat, a conveyor section overlying said seat in position to receive a work piece from the conveyor line, means for depressing the conveyor section to deposit the work piece on the bed, means for clamping the deposited work piece on the work receiving face of the bed, broaching means contained within the bed and additional means in the bed for operatively moving the broaching means with respect to the work to effect a broaching of the work piece while secured to the bed.

3. A machine for performance of the broaching operation on a heavy work piece, such as an automobile engine block, comprising a rigid, hollow bed member having a longitudinal slot in the upper face thereof, a broach supporting table translatably mounted within the bed, broaching means carried by the table and projecting through the slot in the bed, the bed having a work receiving face formed thereon adjacent the slot, means for securing a work piece in position on said face of the bed with a portion overlying the slot for engagement by the broach on the broaching table, and hydraulic means for effecting a translation of the table and supported broach with respect to the work for performance of the broaching operation thereon.

4. A production line broaching machine of the character described including a bed having work receiving seats and a broach longitudinally reciprocable with respect to said seats, supports rising from the bed adjacent the seats, a work supporting mechanism carried by the supports and including depressible members projectable into a plane below the seats, whereby a work piece positioned thereon will be lowered into engagement with the seats, means for effecting a lowering of said mechanism, a work positioning abutment carried by the bed adjacent the seats in position for engagement with a lowered work piece, means for effecting a lateral shifting of a work piece when on the seats to clamp the same against the abutment and additional means for clamping the work piece against the seats to maintain the same in position against the thrust of the broach.

5. A mechanism for effecting the broaching of heavy articles, such as automobile cylinder blocks, including spaced roller conveyor members, a bed unit sub-tending said conveyor members and having an upper work receiving surface, a sectional work conveyor mechanism carried by the bed in alignment with the other conveyor sections for reception of a work piece therefrom, means for effecting a movement of said mechanism in the direction of the bed to position a supported work piece on the work receiving portion of the bed, means for clamping a positioned work piece with its lower face in engagement with the seating portion of the bed, broaching means reciprocably mounted on the bed in position to engage a portion of the under surface of the work piece, and actuating means for said broaching means extending in subtending relationship to the conveyor, substantially as and for the purpose described.

6. A broaching machine for the purpose described, including a bed unit having upstanding work supporting flanges on the upper face thereof, a broach member supported on the bed between said flanges for longitudinal reciprocation with respect thereto, a conveyor mechanism adjacent the termini of the work supporting flanges of the bed for supporting work on its progress to and beyond the machine, a depressible and elevatable conveyor section supported by the bed adjacent said work supporting flanges, means for effecting a depression of said section to place a supported work piece on the bed flanges, means for securing the work piece in position on said flanges, hydraulic means for effecting a controlled feeding traverse of the broach with respect to the work while in clamped position on the flanges and for effecting a rapid traverse retraction of the broach when the movable conveyor section is in elevated position, supporting the work out of the path thereof.

7. A broach for the purpose described including a hollow bed, of ways contained within the bed, a table member slideably mounted upon the ways, means for hydraulically effecting a feeding movement of the table in one direction and a rapid traverse movement thereof in the opposite direction, a surface broach member rigidly mounted upon the table and movable therewith for performance of a broaching operation, spaced work supporting portions rising from the bed and extending in overlying relation with the table, the spacing of said members providing a slot through which the broach on the table projects, and means for securing a work piece to the bed in spanning relation to said slot whereby traverse of the broach will cause the same to operate on the intermediate portion of the work piece which spans said slot.

8. A broach for the purpose described including a hollow bed, of ways contained within the bed, a table member slideably mounted upon the ways, means for hydraulically effecting a feeding movement of the table in one direction and a rapid traverse movement thereof in the opposite direction, a surface broach member rigidly mounted upon the table and movable therewith for performance of a broaching operation, spaced work supporting portions rising from the bed and extending in overlying relation with the table, the spacing of said members providing a slot through which the broach on the table projects, means for securing a work piece to the bed in spanning relation to said slot whereby traverse of the broach will cause the same to operate on the intermediate portion of the work piece which spans said slot, and pressure responsive means carried by the bed and effective during feeding movement to dampen surging of the table and its supported broaching tool with respect to the bed.

MILLARD ROMAINE.
ERWIN G. ROEHM.